UNITED STATES PATENT OFFICE.

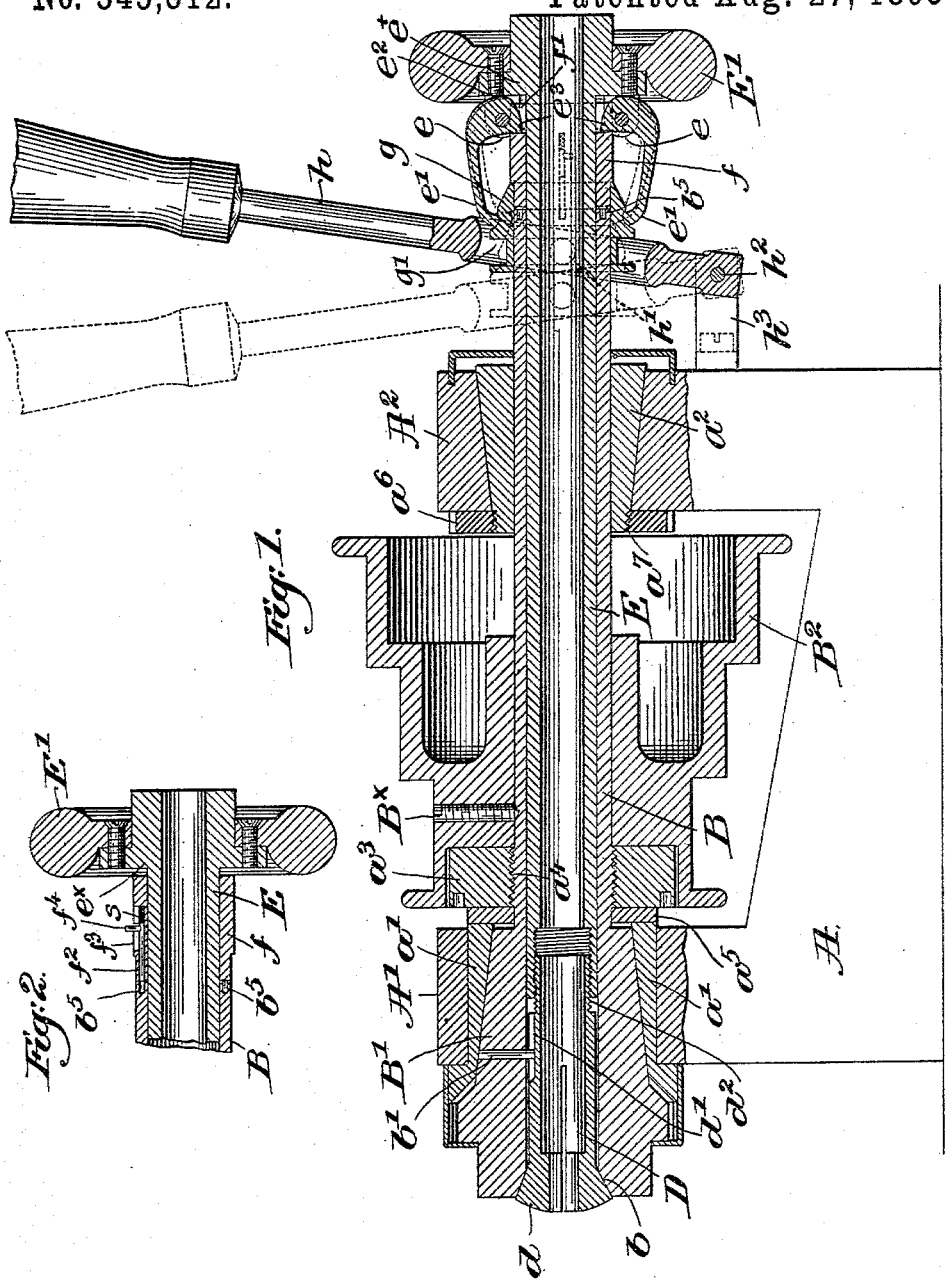

EDWARD RIVETT, OF BOSTON, MASSACHUSETTS.

DRAWING-IN SPINDLE FOR HEAD-STOCKS.

SPECIFICATION forming part of Letters Patent No. 545,312, dated August 27, 1895.

Application filed January 4, 1895. Serial No. 533,820. (No model.)

*To all whom it may concern:*

Be it known that I, EDWARD RIVETT, of Boston, county of Suffolk, State of Massachusetts, have invented an Improvement in Drawing-In Spindles for Head-Stocks, of which the following description, in connection with the accompanying drawings, is a specification, like letters on the drawings representing like parts.

This invention has for its object the production of a drawing-in spindle for lathe headstocks by means of which the chuck can be readily adjusted to the proper size to receive the article to be turned and maintained in adjustment, the chuck being opened or closed by a suitable device during the running of the lathe.

By means of this invention the chuck can be adjusted to the article to be turned and each time the clutch will be opened to the same extent, so that no time or labor is wasted in again closing the chuck nor in opening it too little or too much. When turning a series of similar articles, for all of which one setting of the chuck is sufficient, a very great saving of time and labor is thus effected, particularly as the operator can open and close the chuck without altering the adjustment or stopping the lathe.

In accordance therewith my invention consists in the combination, with a tubular chuck-spindle, a drawing-in spindle journaled therein, and a chuck connected and adjusted by rotation of the said drawing-in spindle, of independent means to positively lock the latter from rotation in the chuck-spindle and devices to clamp and unclamp the chuck, substantially as will be described.

Other features of my invention will be hereinafter described, and particularly pointed out in the claims.

Figure 1 represents a central longitudinal section of a lathe head-stock embodying my invention, and Fig. 2 is a similar detail view taken on a horizontal plane through the drawing-in spindle to show the locking mechanism.

The head-stock A, having front and rear bearings A' and A$^2$, respectively, and containing tapering bearing-sleeves $a'$ and $a^2$, the tubular chuck-spindle B, having the tapered or conical forward end B' to enter the sleeve $a'$, and the cone-pulley B$^2$, secured to the chuck-spindle by a suitable set-screw B$^x$, are and may be substantially of usual and well-known construction.

The front end of the pulley B$^2$ is recessed to receive therein a nut $a^3$, threaded onto the chuck-spindle at $a^4$ and bearing preferably against a loose collar or washer $a^5$, interposed between it and the inner end of the tapering sleeve $a'$. Rotation of the nut $a^3$ to the left, Fig. 1, forces the said sleeve into the bearing A' and takes up wear of the bearing parts from time to time, besides aiding to prevent longitudinal movement of the chuck-spindle B.

A tapering sleeve $a^2$ in the bearing A$^2$ surrounds the chuck-spindle, and is held in position and adjusted to take up wear by an adjusting-nut $a^6$, threaded onto the end of the sleeve at $a^7$ and resting against the inner side of the bearing.

A slitted expansible chuck D, having the usual conical or tapering outer end $d$, adapted to fit in a correspondingly-shaped recess $b$ in the forward end of the chuck-spindle B, is prevented from rotation therein by a stop-pin $b'$, extended through a hole in the tapering portion of the chuck-spindle and projecting in a longitudinal groove $d'$ in the chuck, all as in the usual manner common to devices of this class.

The inner end of the chuck is exteriorly threaded at $d^2$ to be engaged by the interiorly-threaded end of the tubular drawing-in spindle E, journaled in the chuck-spindle B, for regulating the effective opening of the chuck D, rotation of the drawing-in spindle in one or the other direction by a hand-wheel E', secured to its rear end, moving the chuck in or out in its tapering recess in the chuck-spindle.

A locking device is provided for maintaining the adjusted effective opening of the chuck when unclamped, said device consisting, essentially, of a collar $f$, surrounding the drawing-in spindle between the hub $e^x$ of the hand-wheel and the rear end of the chuck-spindle B. Ears $e$ on the hub $e^x$ have pivoted thereto levers $e'$, cam-shaped at $e^2$ to bear against the hub and having toes $e^3$ to enter and bear against the inner ends of slots $f''$ in the collar $f$. The levers $e'$ are controlled by a cone-sleeve $g$, having an annular groove $g'$, pins or projections $h'$ (see dotted lines, Fig. 1,) on an operating-lever $h$ entering said groove to move the sleeve $g$ into full or dotted line position, to thereby clamp or release the chuck D, the said lever $h$ being pivoted at $h^2$ to a bracket $h^3$ on the head-stock.

By referring to the drawings, Fig. 1, it will be seen that when the parts are in full-line position the levers $e'$ will, through their cam portions $e^2$ and toes $e^3$, act to force the drawing-in spindle E to the right, drawing in the chuck D and clamping it, the collar $f$ bearing against the rear end of the chuck-spindle B. When the operating-handle $h$ is moved into dotted-line position, the levers $e'$ will permit the drawing-in spindle to be moved into the chuck-spindle, releasing the chuck.

To prevent the drawing-in spindle from rotating within the chuck-spindle and thereby altering the adjustment of the chuck D, I have devised means to lock the collar $f$ to the chuck-spindle, and, as herein shown, I have provided the end of said spindle with a series of holes $b^5$, Figs. 1 and 2, any one of which is adapted to be entered by a locking-pin $f^2$, longitudinally movable in a hole in the collar $f$, the collar being slotted at $f^3$ to receive a spring $s$, acting against the inner end of the pin $f^2$ to normally project it. The pin is upturned at $f^4$ to form a finger-piece, by which it can be withdrawn from engagement with the chuck-spindle B.

When the drawing-in spindle E has been turned to adjust the chuck D to the proper opening when unclamped, the locking-pin $f^2$ is permitted to enter one of the holes $b^5$ in the chuck-spindle, so that it and the collar $f$ must rotate together, and no movement of the operating-handle $h$ to clamp or unclamp the chuck will release the locking-pin. When the work is clamped in the chuck, the locking-pin $f^2$ is relieved from shearing strain by the levers $e'$, which at such time rigidly clamp the collar $f'$ between the end of the chuck-spindle and the hub of the hand-wheel E'.

So far as I am aware it is broadly new to provide means for locking the drawing-in spindle in adjusted position and to clamp and unclamp the chuck without interfering with or altering such adjustment; and my invention is therefore not restricted to the exact construction and arrangement herein shown nor to the particular locking mechanism shown, for the same may be modified or rearranged without departing from the spirit and scope of my invention.

I claim—

1. The combination with a tubular chuck-spindle, a drawing-in spindle journaled therein, and a chuck connected to and adjusted by rotation of said drawing-in spindle, of independent means to positively lock the latter from rotation in the chuck-spindle, and devices to clamp and unclamp the chuck, substantially as described.

2. A tubular chuck-spindle, a drawing-in spindle journaled therein, and a chuck adjusted by rotation of the drawing-in spindle, combined with means to lock said spindles together and maintain the adjustment of the chuck, clamping devices carried by the chuck-spindle to open or close the chuck, and an actuator to control said clamping devices, substantially as described.

3. A tubular chuck-spindle, a drawing-in spindle journaled therein, and a chuck adjusted by rotation of the drawing-in spindle, combined with a collar on and rotatable with the drawing-in spindle adjacent the rear end of the chuck-spindle, a locking device to lock said collar and chuck-spindle together, and means to clamp the chuck and relieve the locking device from torsional strain, substantially as described.

4. A tubular chuck-spindle, a drawing-in spindle journaled therein, and a chuck connected to and adjusted by rotation of the drawing-in spindle, combined with a collar rotatable with said drawing-in spindle and adjacent the rear end of the chuck-spindle, and a locking pin on one to enter one of a series of holes in the other, to lock the collar and chuck-spindle together, to thereby prevent independent rotation of the drawing-in spindle, substantially as described.

In testimony whereof I have signed my name to this specification in the presence of two subscribing witnesses.

EDWARD RIVETT.

Witnesses:
JOHN C. EDWARDS,
AUGUSTA E. DEAN.